(12) United States Patent
Chen et al.

(10) Patent No.: US 10,482,372 B2
(45) Date of Patent: Nov. 19, 2019

(54) INTERCONNECTION SCHEME FOR RECONFIGURABLE NEUROMORPHIC HARDWARE

(71) Applicant: Intel Corporation, Santa Clara, CA (US)

(72) Inventors: Gregory K. Chen, Hillsboro, OR (US); Jae-Sun Seo, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 960 days.

(21) Appl. No.: 14/757,397

(22) Filed: Dec. 23, 2015

(65) Prior Publication Data

US 2017/0185888 A1    Jun. 29, 2017

(51) Int. Cl.
| G06N 3/04 | (2006.01) |
| G06N 3/02 | (2006.01) |
| G06N 3/063 | (2006.01) |
| G06F 13/42 | (2006.01) |

(52) U.S. Cl.
CPC ........... *G06N 3/04* (2013.01); *G06F 13/4282* (2013.01); *G06N 3/02* (2013.01); *G06N 3/063* (2013.01)

(58) Field of Classification Search
CPC .. G06N 3/063; G06F 9/44505; G06F 13/4282
See application file for complete search history.

(56) References Cited

U.S. PATENT DOCUMENTS

| 8,856,055 B2 | 10/2014 | Brezzo et al. |
| 8,930,291 B1 | 1/2015 | Srinivasa et al. |
| 2009/0313195 A1 | 12/2009 | McDaid et al. |
| 2013/0073497 A1 | 3/2013 | Akopyan et al. |
| 2014/0180984 A1 | 6/2014 | Arthur et al. |
| 2014/0180987 A1 | 6/2014 | Arthur et al. |
| 2014/0258199 A1* | 9/2014 | Modha ...................... G06N 3/02 706/26 |
| 2015/0120631 A1 | 4/2015 | Serrano Gotarredona et al. |
| 2015/0324684 A1 | 11/2015 | Alvarez-Icaza Rivera et al. |

(Continued)

FOREIGN PATENT DOCUMENTS

WO    2017112259 A1    6/2017

OTHER PUBLICATIONS

International Search Report and Written Opinion for PCT Patent Application No. PCT/US2016/063341, dated Mar. 3, 2017; 11 pages.

(Continued)

*Primary Examiner* — Ajay Ojha
(74) *Attorney, Agent, or Firm* — Alliance IP, LLC

(57) ABSTRACT

Systems and methods for an interconnection scheme for reconfigurable neuromorphic hardware are disclosed. A neuromorphic processor may include a plurality of corelets, each corelet may include a plurality of synapse arrays and a neuron array. Each synapse array may include a plurality of synapses and a synapse array router coupled to synapse outputs in a synapse array. Each synapse may include a synapse input, synapse output; and a synapse memory. A neuron array may include a plurality of neurons, each neuron may include a neuron input and a neuron output. Each synapse array router may include a first logic to route one or more of the synapse outputs to one or more of the neuron inputs.

10 Claims, 15 Drawing Sheets

(56) References Cited

U.S. PATENT DOCUMENTS

2016/0283840 A1* 9/2016 Amir ..................... G06N 3/063

OTHER PUBLICATIONS

International Preliminary Report on Patentability in International Application No. PCT/US2016/063341, dated Jun. 26, 2018, 7 pages.
Service, Robert F., "The Brain Chip—Microprocessors modeled on networks of nerve cells promise blazing speed at incredibly low power—if they live up to hopes," Science, vol. 345, Issue 6197, Aug. 8, 2014, pp. 614-616.
Wikipedia, "Artificial neural network," www.wikipedia.org, 17 pages, Dec. 17, 2015.
Wikipedia, "Spiking neural network," www.wikipedia.org, 3 pages, Dec. 2, 2015.

* cited by examiner

INTERCONNECTION SCHEME FOR RECONFIGURABLE NEUROMORPHIC HARDWARE

FIELD OF THE INVENTION

The present disclosure pertains to the field of processing logic, reconfigurable neuromorphic processors, microprocessors, and associated instruction set architecture that, when executed by the processor or other processing logic, perform logical, mathematical, or other functional operations.

DESCRIPTION OF RELATED ART

A neuromorphic processor may be used (alone or in conjunction with another type of processor) to estimate or approximate functions that can depend on a large number of inputs and are generally unknown. For example, neuromorphic processors may allow systems to perform face recognition, to extract information from large data sets, and to perform object detection tasks that may be beyond of the scope of traditionally programmed solutions. Neuromorphic processors may provide a path to computational intelligence by allowing machines to learn features from training data, when programming features in explicitly becomes too complex.

A neuromorphic processor may operate in a manner similar to biological neural networks (such as a central nervous system of an animal). Specifically, a neuromorphic processor may include a network of interconnected "neurons" that may exchange data between one another. Each connection between a neuron may be referred to as a "synapse." A neuron may have one output that may fan out to one or more synapses. At each synapse, the output of a neuron may be multiplied by a synapse weight. This weighted output of a neuron may be transmitted via the one or more synapses to an input of one or more neurons. Neurons may sum (or integrate) these received inputs. When this sum (referred to as a "membrane potential") exceeds a threshold value, a neuron may generate an output (or "fire") from the neuron using a transfer function such as a sigmoid or threshold function. That output may then be passed via one or more synapses to one or more neurons as an input. Once a neuron fires, it may disregard previously received input information, thereby resetting the neuron.

A synapse weight may be selected, modified, or adjusted, making neural nets adaptive to inputs and capable of learning. Accordingly, a neuromorphic processor may not require a setup program, but rather may be a learning architecture that may be trained through iterative adjustment of synapse weights.

DESCRIPTION OF THE FIGURES

Embodiments are illustrated by way of example and not limitation in the Figures of the accompanying drawings.

DETAILED DESCRIPTION

Figure 1A:
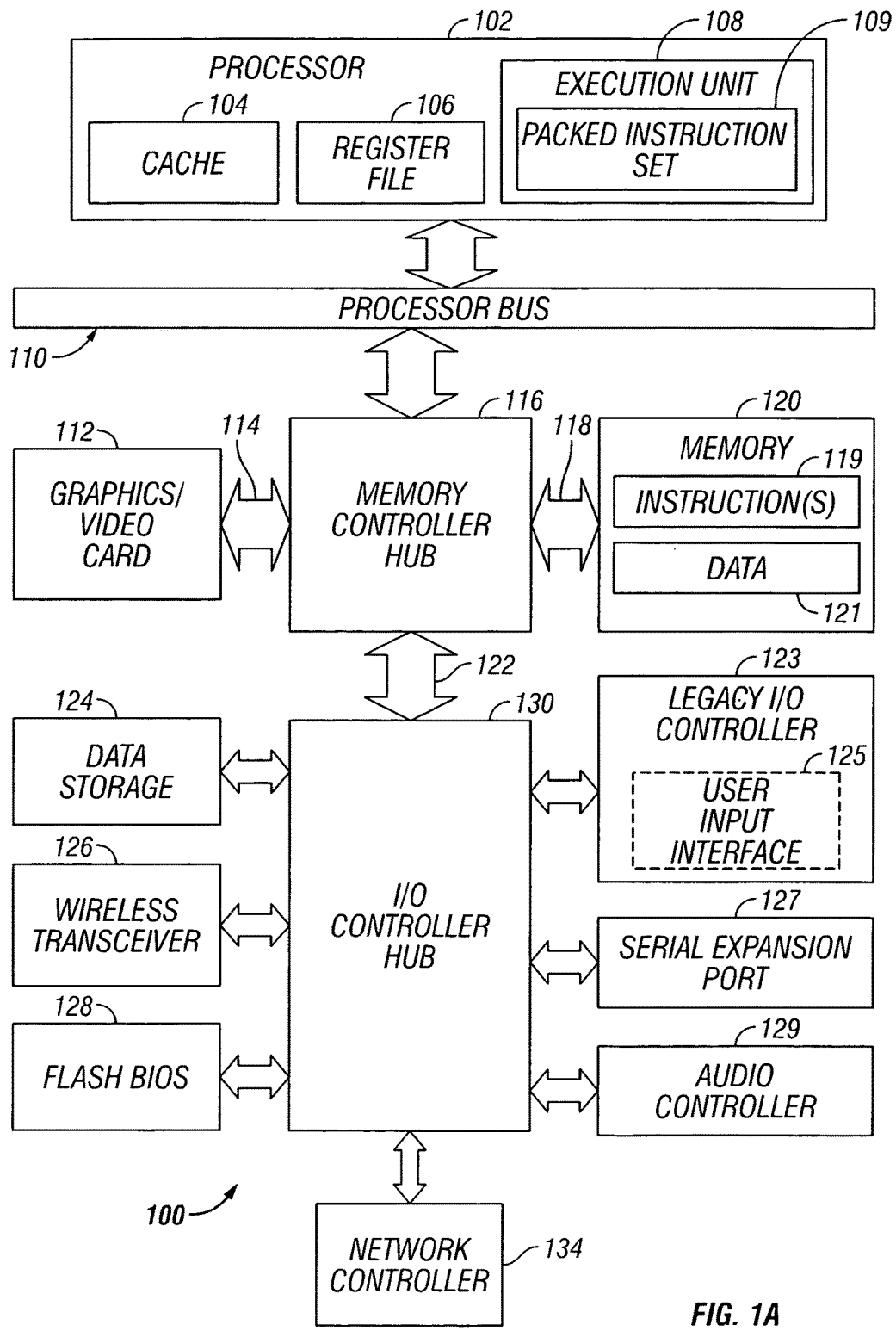
FIG. 1A is a block diagram of an exemplary computer system formed with a processor that may include execution units to execute an instruction, in accordance with embodiments of the present disclosure.

The following description describes a reconfigurable neuromorphic processor. A reconfigurable neuromorphic processor may operate alone or in conjunction with another processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a Dynamic Random Access Memory (DRAM) device, a Static Random Access Memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
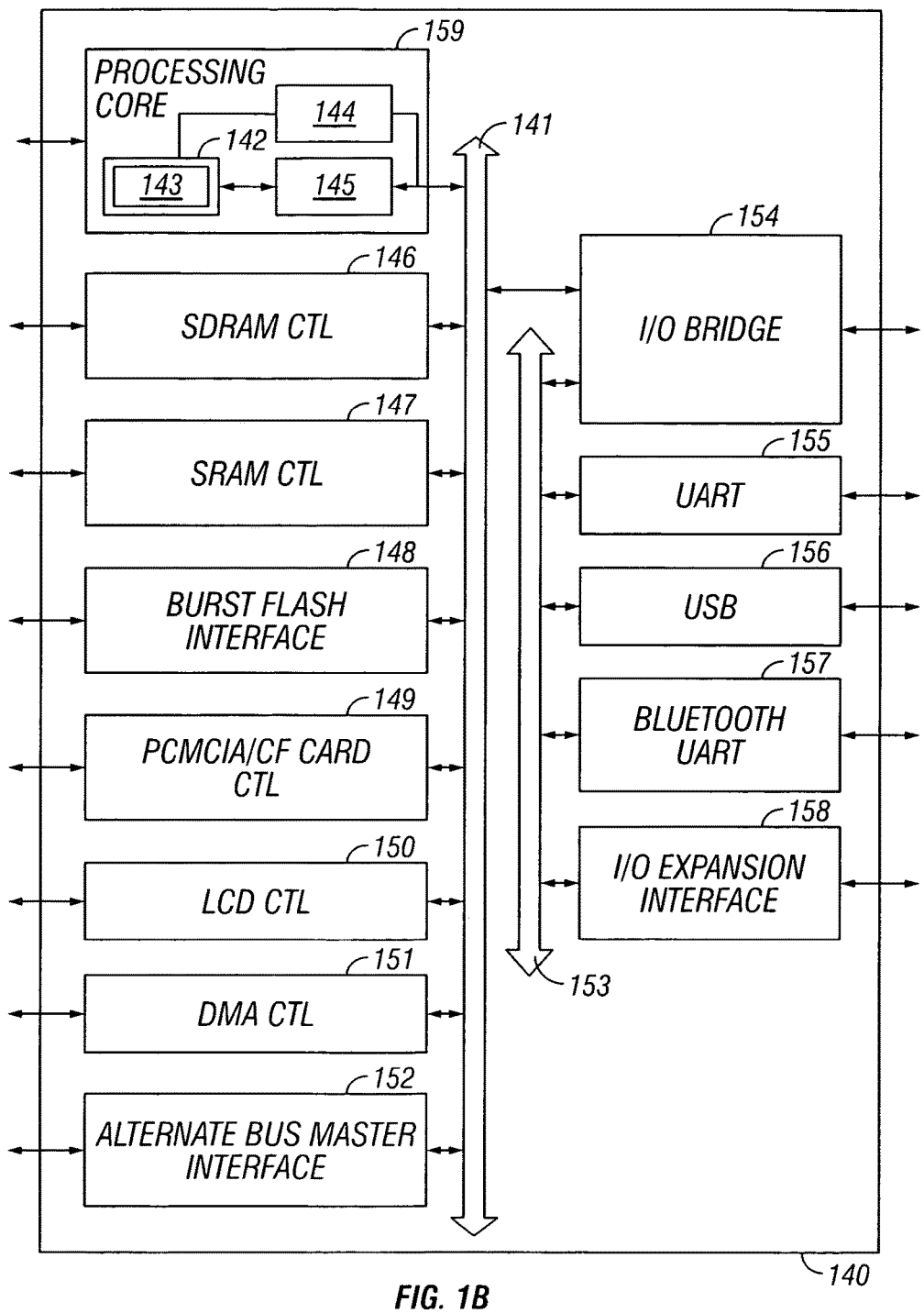
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW-type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, Synchronous Dynamic Random Access Memory (SDRAM) control 146, Static Random Access Memory (SRAM) control 147, burst flash memory interface 148, Personal Computer Memory Card International Association (PCMCIA)/Compact Flash (CF) card control 149, Liquid Crystal Display (LCD) control 150, Direct Memory Access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, Universal Asynchronous Receiver/Transmitter (UART) 155, Universal Serial Bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
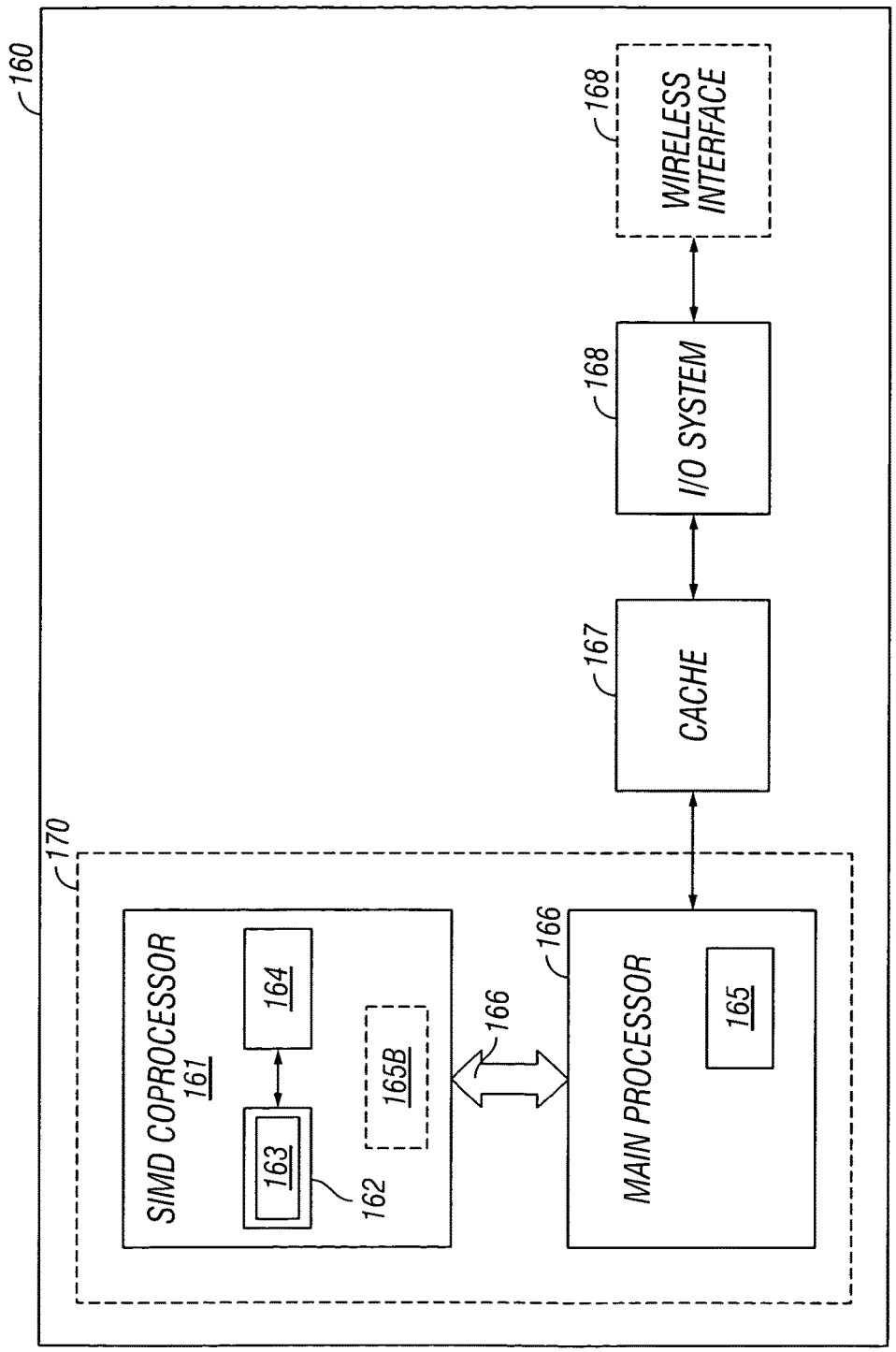
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 165 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 166, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
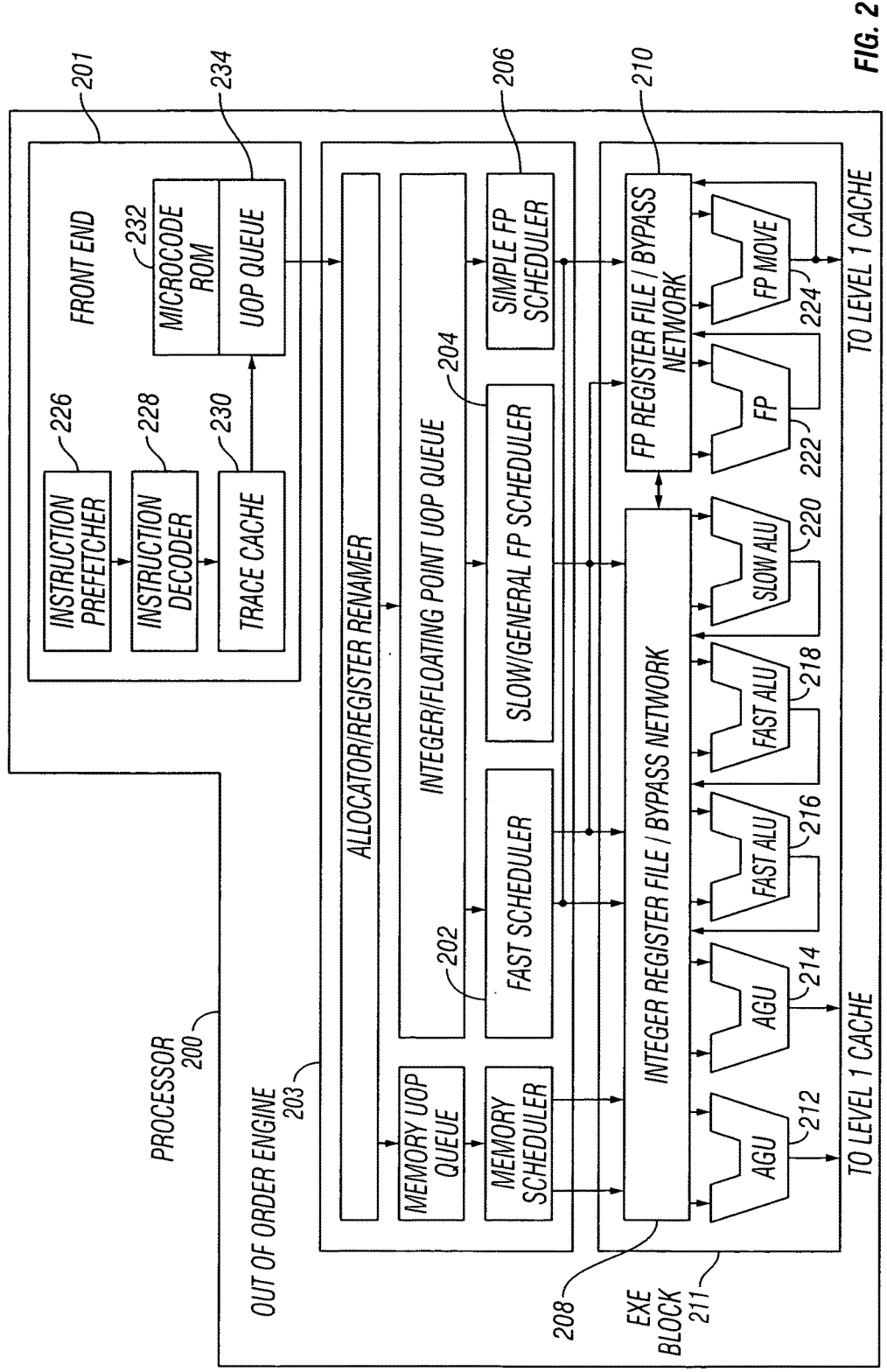
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro-ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast Arithmetic Logic Unit (ALU) 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
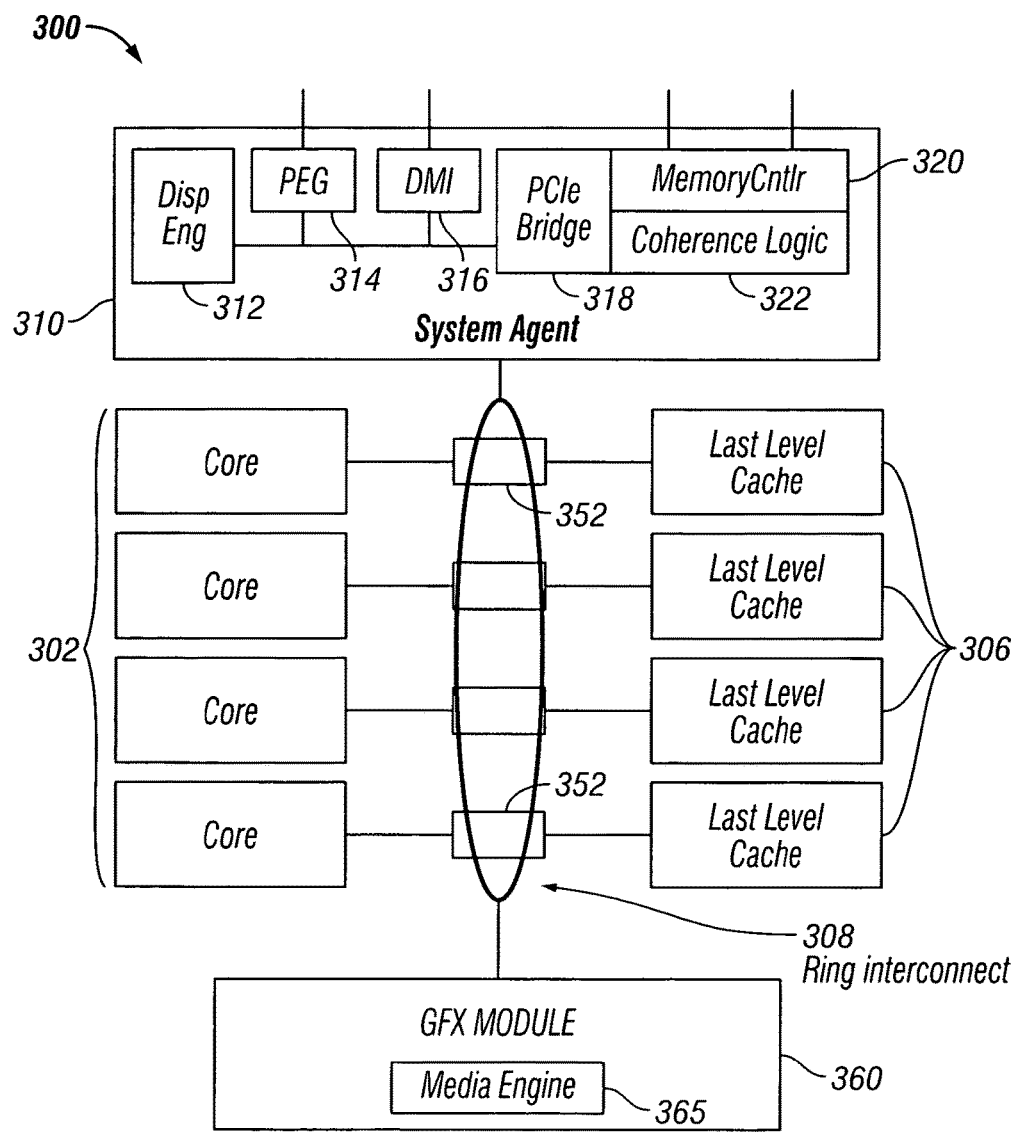
FIG. 3A is a block diagram of a processor, in accordance with embodiments of the present disclosure.
Figure 3B:
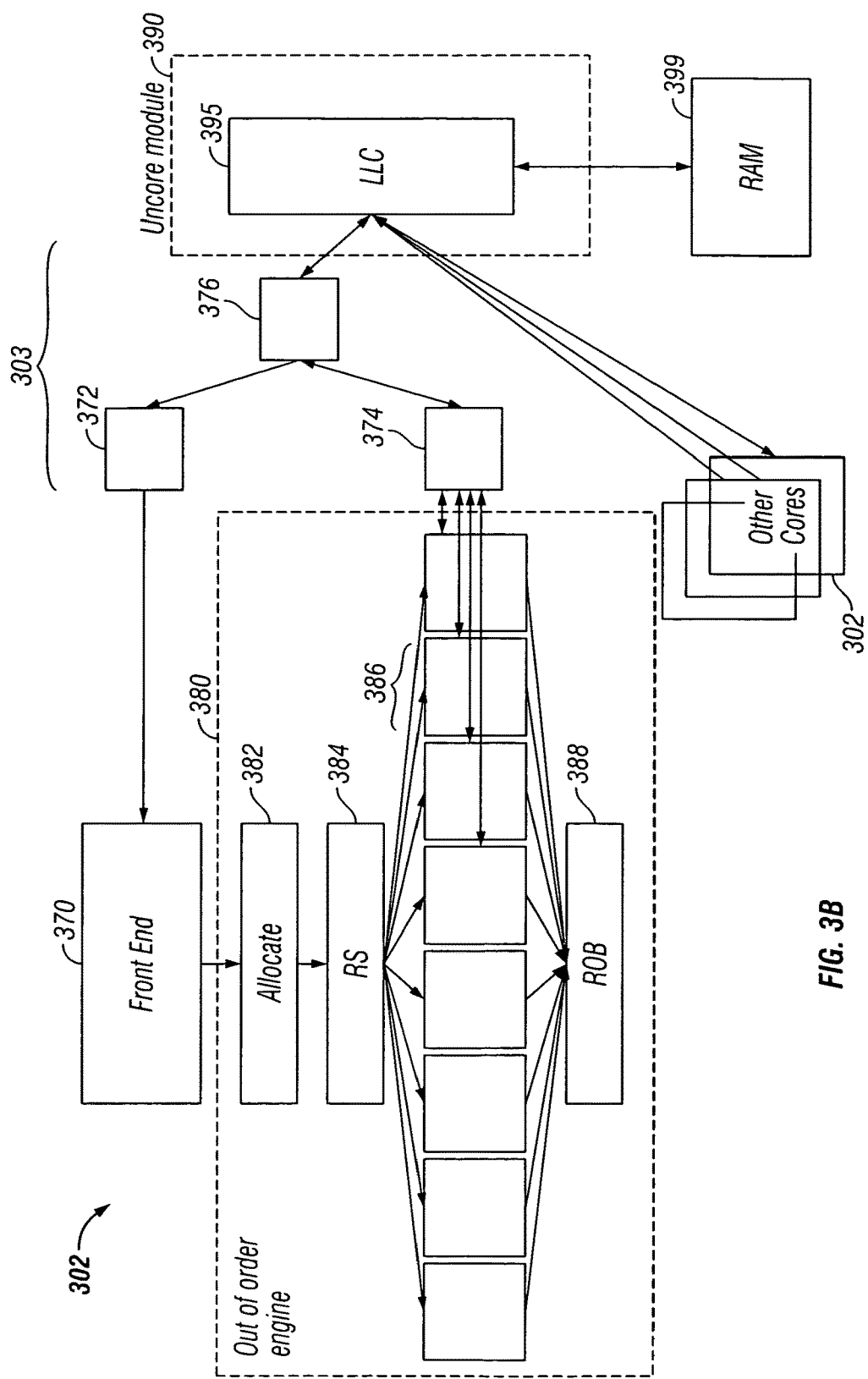
FIG. 3B is a block diagram of an example implementation of a core, in accordance with embodiments of the present disclosure.
Figure 4:
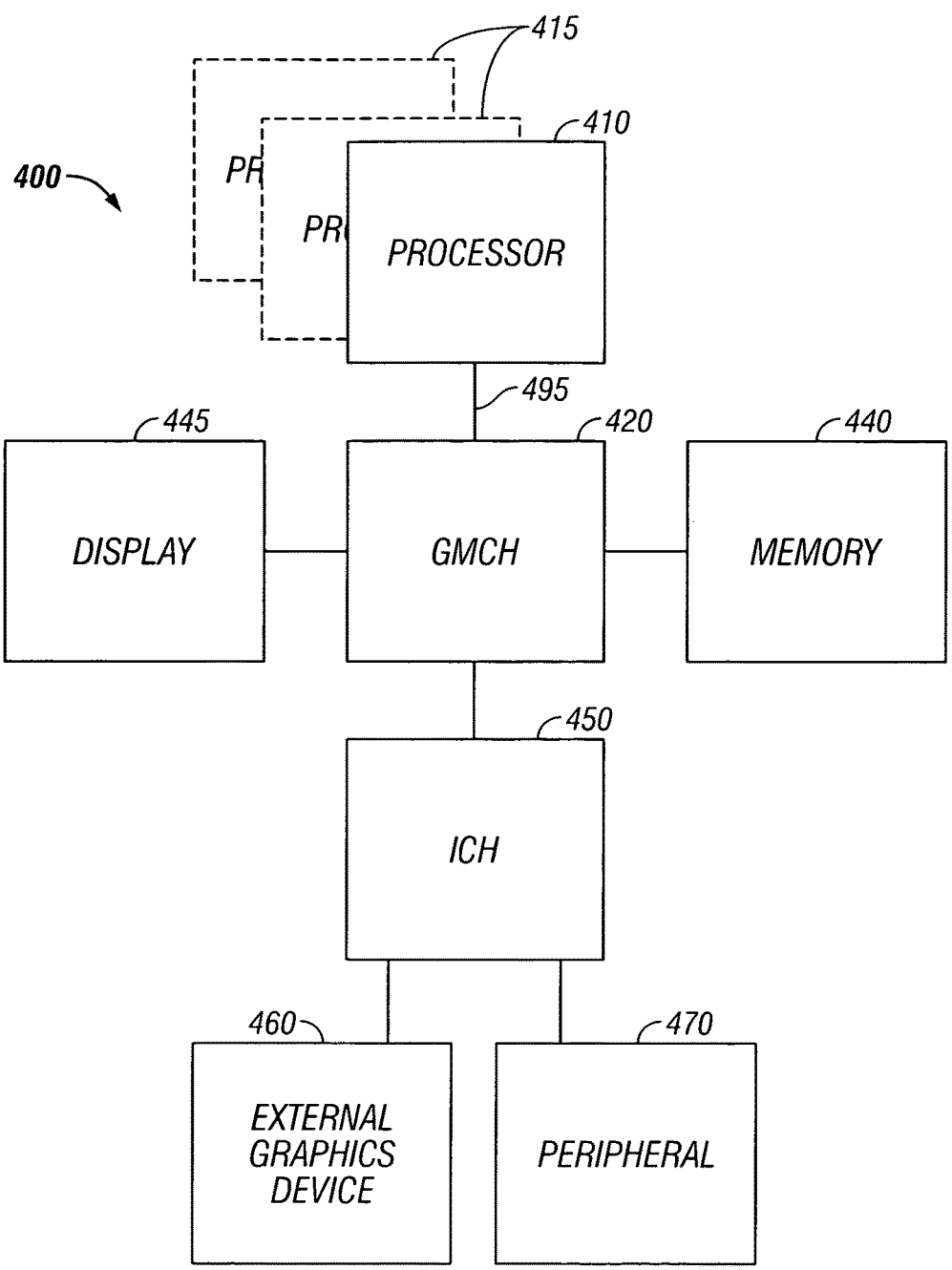
FIG. 4 is a block diagram of a system, in accordance with embodiments of the present disclosure.
Figure 5:
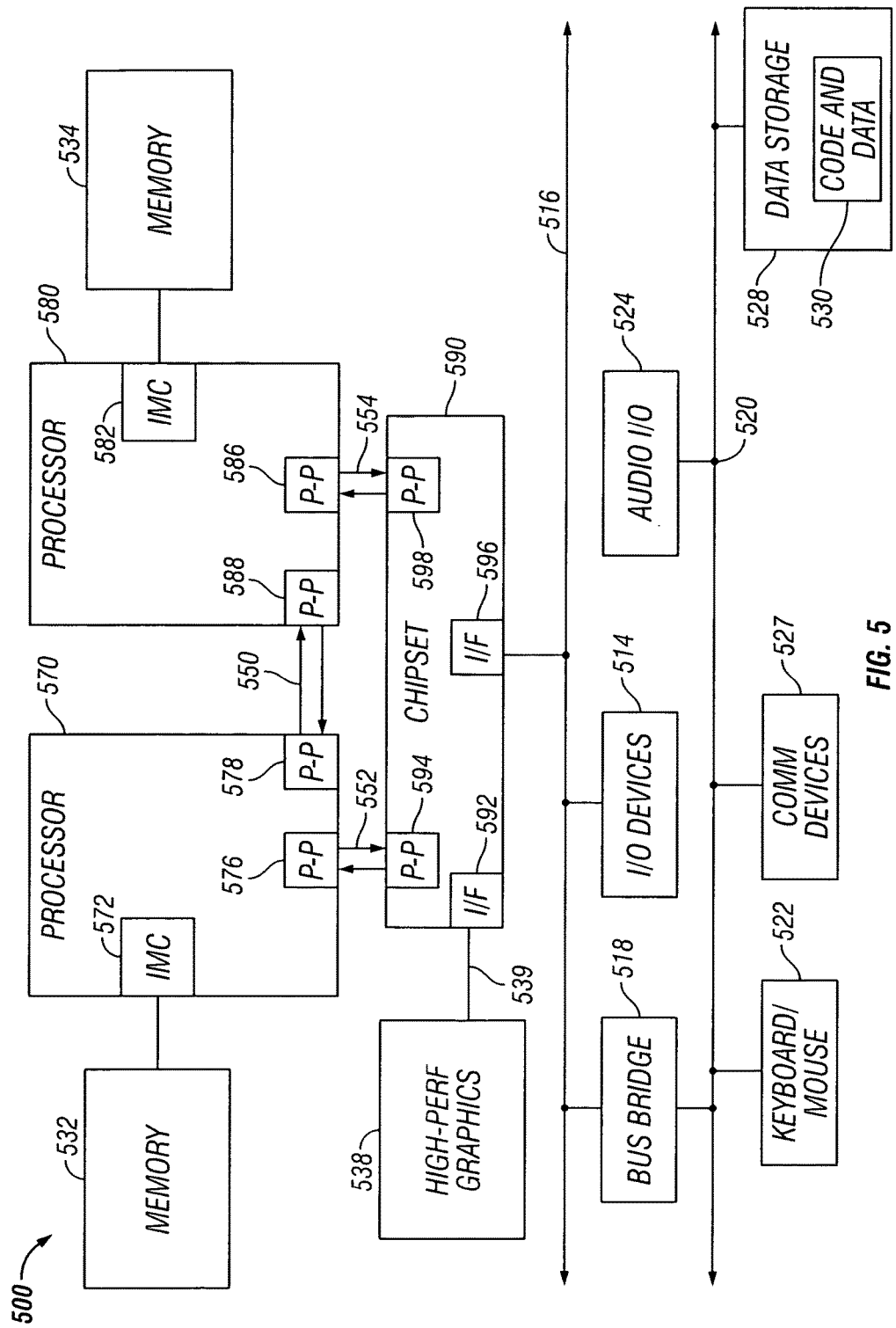
FIG. 5 is a block diagram of a second system, in accordance with embodiments of the present disclosure.

FIGS. 3-5 may illustrate exemplary systems suitable for including processor 300, while FIG. 4 may illustrate an exemplary System on a Chip (SoC) that may include one or more of cores 302. Other system designs and implementations known in the arts for laptops, desktops, handheld PCs, personal digital assistants, engineering workstations, servers, network devices, network hubs, switches, embedded processors, DSPs, graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 4 illustrates a block diagram of a system 400, in accordance with embodiments of the present disclosure. System 400 may include one or more processors 410, 415, which may be coupled to Graphics Memory Controller Hub (GMCH) 420. The optional nature of additional processors 415 is denoted in FIG. 4 with broken lines.

Each processor 410, 415 may be some version of processor 300. However, it should be noted that integrated graphics logic and integrated memory control units might not exist in processors 410, 415. FIG. 4 illustrates that GMCH 420 may be coupled to a memory 440 that may be, for example, a dynamic random access memory (DRAM). The DRAM may, for at least one embodiment, be associated with a non-volatile cache.

GMCH 420 may be a chipset, or a portion of a chipset. GMCH 420 may communicate with processors 410, 415 and control interaction between processors 410, 415 and memory 440. GMCH 420 may also act as an accelerated bus interface between the processors 410, 415 and other elements of system 400. In one embodiment, GMCH 420 communicates with processors 410, 415 via a multi-drop bus, such as a frontside bus (FSB) 495.

Furthermore, GMCH 420 may be coupled to a display 445 (such as a flat panel display). In one embodiment, GMCH 420 may include an integrated graphics accelerator. GMCH 420 may be further coupled to an input/output (I/O) controller hub (ICH) 450, which may be used to couple various peripheral devices to system 400. External graphics device 460 may include be a discrete graphics device coupled to ICH 450 along with another peripheral device 470.

In other embodiments, additional or different processors may also be present in system 400. For example, additional processors 410, 415 may include additional processors that may be the same as processor 410, additional processors that may be heterogeneous or asymmetric to processor 410, accelerators (such as, e.g., graphics accelerators or digital signal processing (DSP) units), field programmable gate arrays, or any other processor. There may be a variety of differences between the physical resources 410, 415 in terms of a spectrum of metrics of merit including architectural, micro-architectural, thermal, power consumption characteristics, and the like. These differences may effectively manifest themselves as asymmetry and heterogeneity amongst processors 410, 415. For at least one embodiment, various processors 410, 415 may reside in the same die package.

FIG. 5 illustrates a block diagram of a second system 500, in accordance with embodiments of the present disclosure. As shown in FIG. 5, multiprocessor system 500 may include a point-to-point interconnect system, and may include a first processor 570 and a second processor 580 coupled via a point-to-point interconnect 550. Each of processors 570 and 580 may be some version of processor 300 as one or more of processors 410,615.

While FIG. 5 may illustrate two processors 570, 580, it is to be understood that the scope of the present disclosure is not so limited. In other embodiments, one or more additional processors may be present in a given processor.

Processors 570 and 580 are shown including integrated memory controller units 572 and 582, respectively. Processor 570 may also include as part of its bus controller units point-to-point (P-P) interfaces 576 and 578; similarly, second processor 580 may include P-P interfaces 586 and 588. Processors 570, 580 may exchange information via a point-to-point (P-P) interface 550 using P-P interface circuits 578, 588. As shown in FIG. 5, IMCs 572 and 582 may couple the processors to respective memories, namely a memory 532 and a memory 534, which in one embodiment may be portions of main memory locally attached to the respective processors.

Processors 570, 580 may each exchange information with a chipset 590 via individual P-P interfaces 552, 554 using point to point interface circuits 576, 594, 586, 598. In one embodiment, chipset 590 may also exchange information with a high-performance graphics circuit 538 via a high-performance graphics interface 539.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present disclosure is not so limited.

As shown in FIG. 5, various I/O devices 514 may be coupled to first bus 516, along with a bus bridge 518 which couples first bus 516 to a second bus 520. In one embodiment, second bus 520 may be a Low Pin Count (LPC) bus. Various devices may be coupled to second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to second bus 520. Note that other architectures may be possible. For example, instead of the point-to-point architecture of FIG. 5, a system may implement a multi-drop bus or other such architecture.

Figure 6:
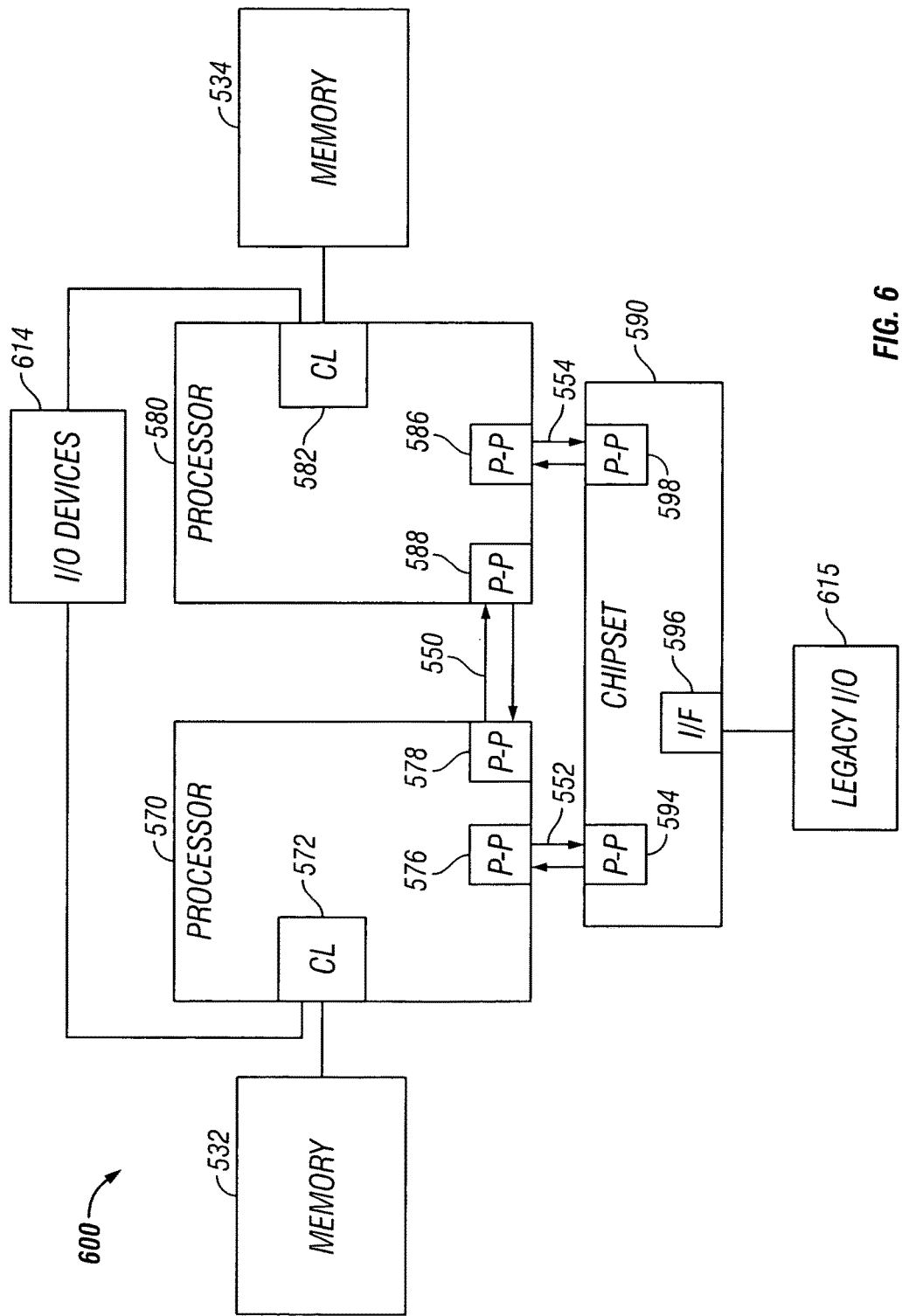
FIG. 6 is a block diagram of a third system in accordance with embodiments of the present disclosure.

FIG. 6 illustrates a block diagram of a third system 600 in accordance with embodiments of the present disclosure. Like elements in FIGS. 5 and 6 bear like reference numerals, and certain aspects of FIG. 5 have been omitted from FIG. 6 in order to avoid obscuring other aspects of FIG. 6.

FIG. 6 illustrates that processors 670, 680 may include integrated memory and I/O Control Logic ("CL") 672 and 682, respectively. For at least one embodiment, CL 672, 682 may include integrated memory controller units such as that described above in connection with FIGS. 3-5. In addition, CL 672, 682 may also include I/O control logic. FIG. 6 illustrates that not only memories 632, 634 may be coupled to CL 672, 682, but also that I/O devices 614 may also be coupled to control logic 672, 682. Legacy I/O devices 615 may be coupled to chipset 690.

Figure 7:
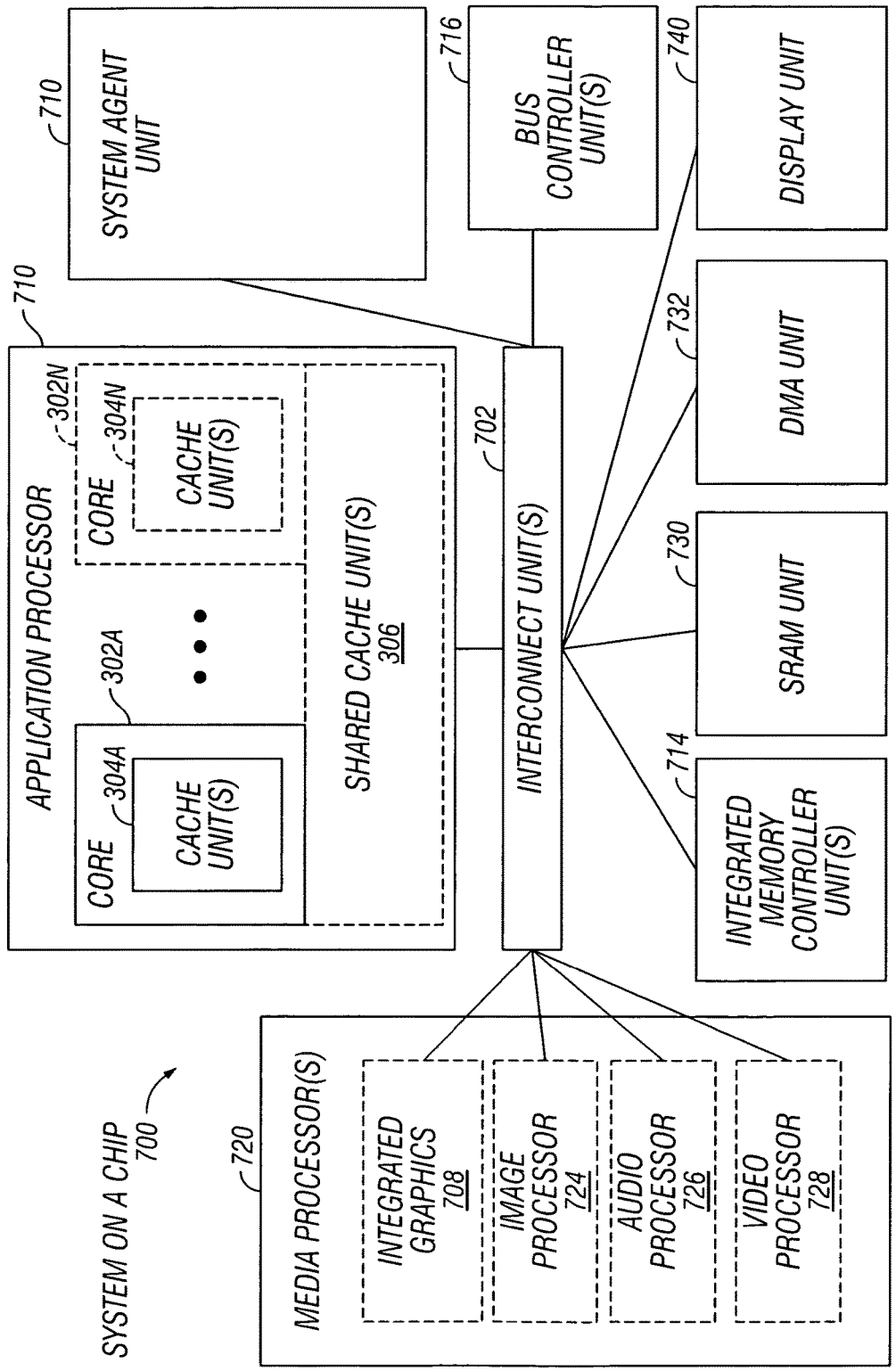
FIG. 7 is a block diagram of a system-on-a-chip, in accordance with embodiments of the present disclosure.

FIG. 7 illustrates a block diagram of a SoC 700, in accordance with embodiments of the present disclosure. Similar elements in FIG. 3 bear like reference numerals. Also, dashed lined boxes may represent optional features on more advanced SoCs. An interconnect units 702 may be coupled to: an application processor 710 which may include a set of one or more cores 702A-N and shared cache units 706; a system agent unit 711; a bus controller units 716; an integrated memory controller units 714; a set or one or more media processors 720 which may include integrated graphics logic 708, an image processor 724 for providing still and/or video camera functionality, an audio processor 726 for providing hardware audio acceleration, and a video processor 728 for providing video encode/decode acceleration; an SRAM unit 730; a DMA unit 732; and a display unit 740 for coupling to one or more external displays.

Figure 8:
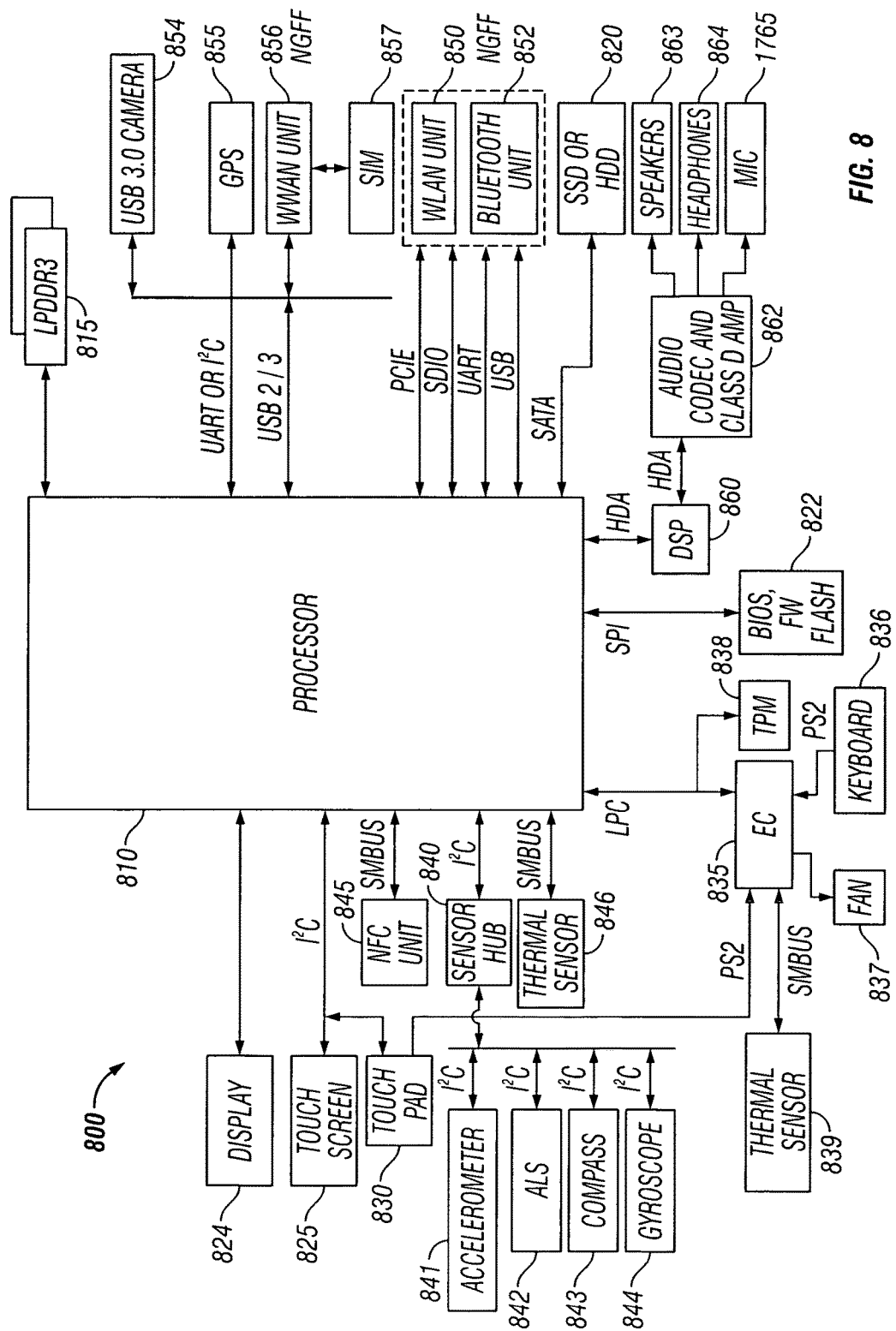
FIG. 8 is a block diagram of an electronic device for utilizing a processor, in accordance with embodiments of the present disclosure.

FIG. 8 is a block diagram of an electronic device 800 for utilizing a processor 810, in accordance with embodiments of the present disclosure. Electronic device 800 may include, for example, a notebook, an ultrabook, a computer, a tower server, a rack server, a blade server, a laptop, a desktop, a tablet, a mobile device, a phone, an embedded computer, or any other suitable electronic device.

Electronic device 800 may include processor 810 communicatively coupled to any suitable number or kind of components, peripherals, modules, or devices. Such coupling may be accomplished by any suitable kind of bus or interface, such as I$^2$C bus, System Management Bus (SMBus), Low Pin Count (LPC) bus, SPI, High Definition Audio (HDA) bus, Serial Advance Technology Attachment (SATA) bus, USB bus (versions 1, 2, 3), or Universal Asynchronous Receiver/Transmitter (UART) bus.

Such components may include, for example, a display 824, a touch screen 825, a touch pad 830, a Near Field Communications (NFC) unit 845, a sensor hub 840, a thermal sensor 846, an Express Chipset (EC) 835, a Trusted Platform Module (TPM) 838, BIOS/firmware/flash memory 822, a DSP 860, a drive 820 such as a Solid State Disk (SSD) or a Hard Disk Drive (HDD), a wireless local area network (WLAN) unit 850, a Bluetooth unit 852, a Wireless Wide Area Network (WWAN) unit 856, a Global Positioning System (GPS), a camera 854 such as a USB 3.0 camera, or a Low Power Double Data Rate (LPDDR) memory unit 815 implemented in, for example, the LPDDR3 standard. These components may each be implemented in any suitable manner.

Furthermore, in various embodiments other components may be communicatively coupled to processor 810 through the components discussed above. For example, an accelerometer 841, Ambient Light Sensor (ALS) 842, compass 843, and gyroscope 844 may be communicatively coupled to sensor hub 840. A thermal sensor 839, fan 837, keyboard 846, and touch pad 830 may be communicatively coupled to EC 835. Speaker 863, headphones 864, and a microphone 865 may be communicatively coupled to an audio unit 864, which may in turn be communicatively coupled to DSP 860. Audio unit 864 may include, for example, an audio codec and a class D amplifier. A SIM card 857 may be communicatively coupled to WWAN unit 856. Components such as WLAN unit 850 and Bluetooth unit 852, as well as WWAN unit 856 may be implemented in a Next Generation Form Factor (NGFF).

Figure 9:
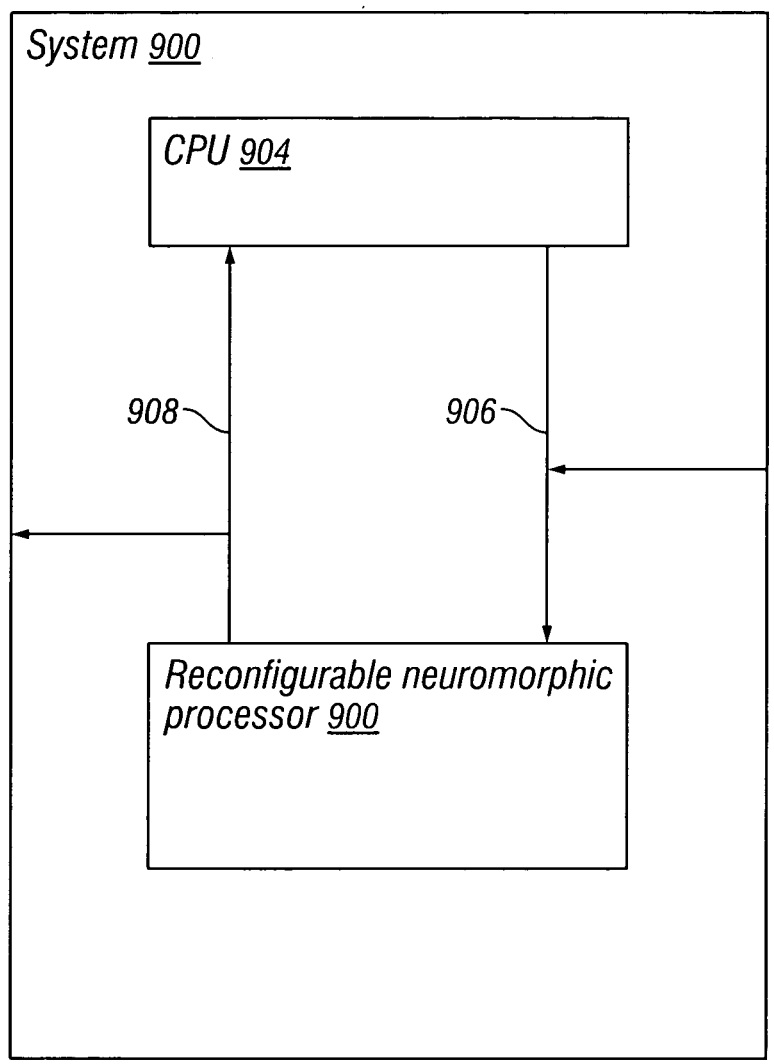
FIG. 9 is a block diagram of a system including a reconfigurable neuromorphic processor, according to embodiments of the present disclosure.

FIG. 9 is a block diagram of a system 900 including a reconfigurable neuromorphic processor, according to embodiments of the present disclosure. System 900 may include, for example, a notebook, an ultrabook, a computer, a tower server, a rack server, a blade server, a laptop, a desktop, a tablet, a mobile device, a phone, an embedded computer, or any other suitable electronic device. System 900 may include CPU 904 communicatively coupled to any suitable number or kind of components, peripherals, modules, or devices. Such coupling may be accomplished by any suitable kind of bus or interface, such as I²C bus, System Management Bus (SMBus), Low Pin Count (LPC) bus, SPI, High Definition Audio (HDA) bus, Serial Advance Technology Attachment (SATA) bus, USB bus (versions 1, 2, 3), or Universal Asynchronous Receiver/Transmitter (UART) bus.

System 900 may further include reconfigurable neuromorphic processor 902. Reconfigurable neuromorphic processor 902 may be used (alone or in conjunction with another type of processor) to estimate or approximate functions that can depend on a large number of inputs and are generally unknown. For example, reconfigurable neuromorphic processor 902 may allow systems to perform facial recognition, to extract information from large data sets, and to perform object detection tasks that may be beyond of the scope of traditionally programmed solutions. Reconfigurable neuromorphic processor 902 may provide a path to computational intelligence by allowing machines to learn features from training data, when programming features in explicitly becomes too complex. Reconfigurable neuromorphic processor 902 and components thereof may be implemented using circuitry or logic.

Reconfigurable neuromorphic processor 902 may operate in a manner similar to biological neural networks (such as a central nervous system of an animal). Reconfigurable neuromorphic processor 902 may include one or more inputs 906 and one or more outputs 908. Inputs 906 may include circuitry or logic to accept input of digital data. Inputs 906 may be coupled to CPU 904, or may be connected to another component or peripheral component of system 900. Outputs 908 may include circuitry or logic to output digital data from reconfigurable neuromorphic processor 902. Outputs 908 may be coupled to CPU 904, or may be connected to another component or peripheral component of system 900.

System 900 may also include CPU 904. In one embodiment, reconfigurable neuromorphic processor 902 may be located on the same chip, die, or within the same package as CPU 904, which operates in conjunction with a reconfigurable neuromorphic processor. In other embodiments, a reconfigurable neuromorphic processor of the present disclosure may be located in a standalone chip, die, or within a different package as CPU 904 that operates in conjunction with reconfigurable neuromorphic processor 902.

Figure 10:
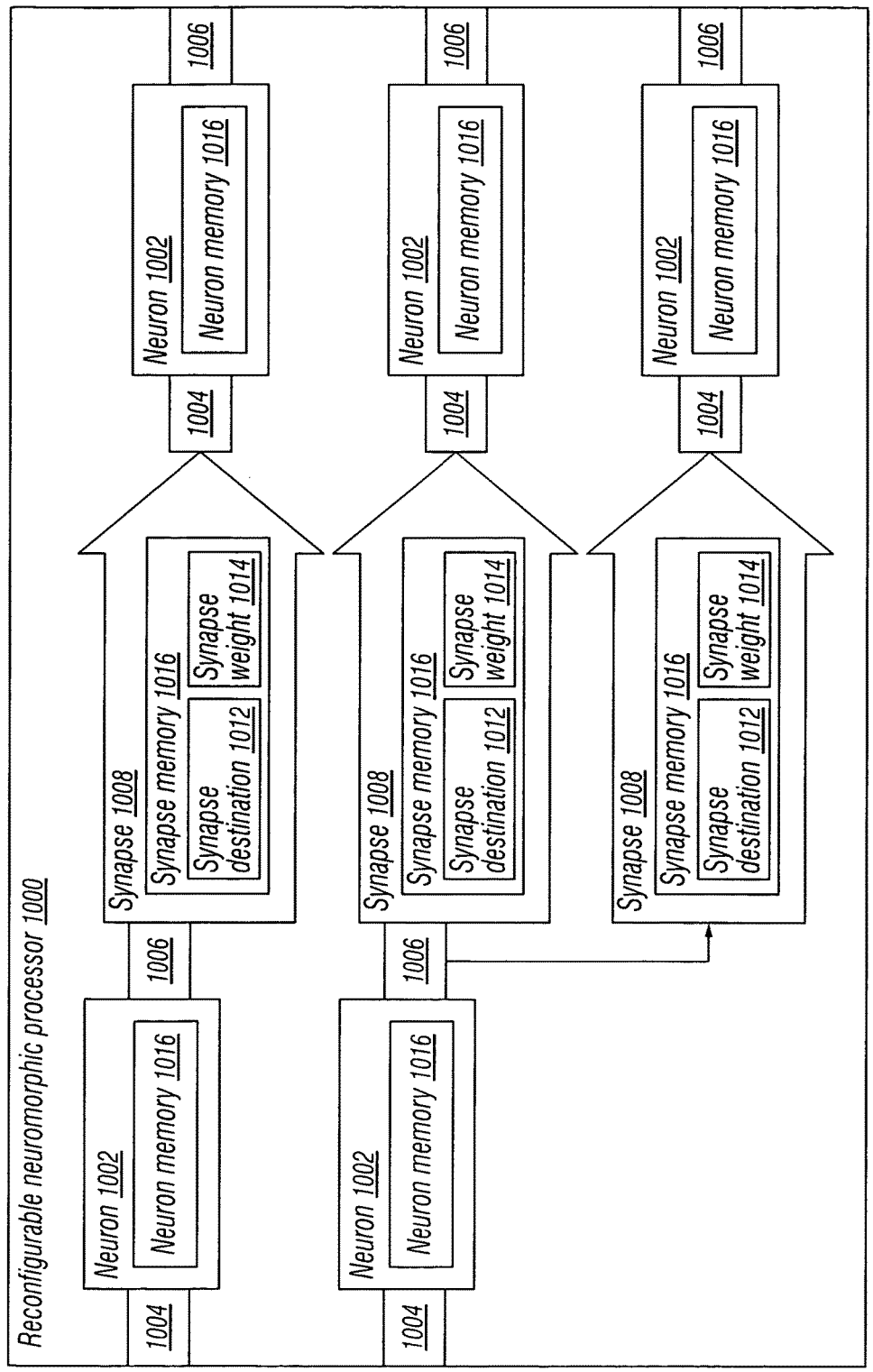
FIG. 10 is a block diagram of an example embodiment of a reconfigurable neuromorphic processor, according to embodiments of the present disclosure.

FIG. 10 is a block diagram of an example embodiment of a reconfigurable neuromorphic processor, according to embodiments of the present disclosure. Reconfigurable neuromorphic processor 1000 may include one or more neurons 1002. Neurons 1002 and components thereof may be implemented using circuitry or logic. Typically, a reconfigurable neuromorphic processor may include thousands or millions of instances of neurons 1002, but any suitable number of neurons may be used. Each instance of neuron 1002 may include neuron input 1004 and neuron output 1006. Neuron inputs 1004 and neuron outputs 1006 may be interconnected. Connections between neuron inputs 1004 and neuron outputs 1006 may be made through synapses 1008. Each instance of neuron 1002 may have one neuron output 1006 that may fan out through one or more synapses 1008 to one or more neuron inputs 1004. Neurons 1002 may sum or integrate a signal received at neuron inputs 1004. In general, neurons 1002 may "fire" (transmit an output pulse) when inputs received through neuron input 1004 exceed a threshold. When this sum (referred to as a" "membrane potential") exceeds a threshold value, a neuron may generate an output (or "fire") from the neuron using a transfer function such as a sigmoid or threshold function. In some embodiments, neurons 1002 may be implemented using circuits or logic that receive inputs and integrate them. In further embodiments, inputs may be averaged, or any other suitable transfer function may be used. Furthermore, neurons 1002 may include comparator circuits or logic that generate an output spike at neuron output 1006 when the result of applying a transfer function to neuron input 1004 exceeds a threshold.

An output spike may be passed from neuron output 1006 via one or more synapses 1008 to one or more neuron inputs 1004 of neurons 1002. Accordingly, each instance of neuron 1002 may include neuron memory 1016. Neuron memory 1016 may be composed of static random access memory, memristors, spin torque memory, or any other suitable type of memory circuit or logic. Neuron memory 1016 may include circuitry or logic that can store one or more neuron destinations. A neuron destination may include a digital address indicating an identity of a synapse to receive an input from a particular instance of neuron 1002. Initial neuron destinations may be written in neuron memory 1016 during setup or training of reconfigurable neuromorphic processor 1000. Neuron destinations may be determined based upon a task to be performed by reconfigurable neuromorphic processor 1000. In some embodiments, a processor, such as CPU 904, may initialize reconfigurable neuromorphic processor 1000 by writing initial neuron destinations in neuron memory 1016.

Synapses 1008 may have an associated synapse weight. When synapses 1008 transmitted an output of an instance of neuron 1002 to an input of an instance of neuron 1002, that output may be multiplied by a synapse weight. During operation, synapse weights of synapses 1008 may be selected, modified, or adjusted, making reconfigurable neuromorphic processor 1000 adaptive to various inputs and capable of learning. Accordingly, a reconfigurable neuromorphic processor may not require a setup program, but rather may be a learning architecture that may be trained through iterative adjustment of synapse weights. Once neuron 1002 fires, it may disregard previously received input information, thereby resetting neuron 1002. Synapses 1008 and components thereof may be implemented using circuitry or logic.

Each synapse 1008 may include synapse memory 1010. Synapse memory 1010 may be composed of static random access memory, memristors, spin torque memory, or any other suitable type of memory circuit or logic. Synapse memory 1010 may store synapse destination 1012 and synapse weight 1014. Synapse destination 1012 may include a digital representation identifying a neuron to which information stored in a particular instance of synapse memory 1010 should be transmitted. Synapse weight 1012 may include a digital representation of a weight to be transmitted to the neuron identified in synapse destination 1012.

Figure 11:
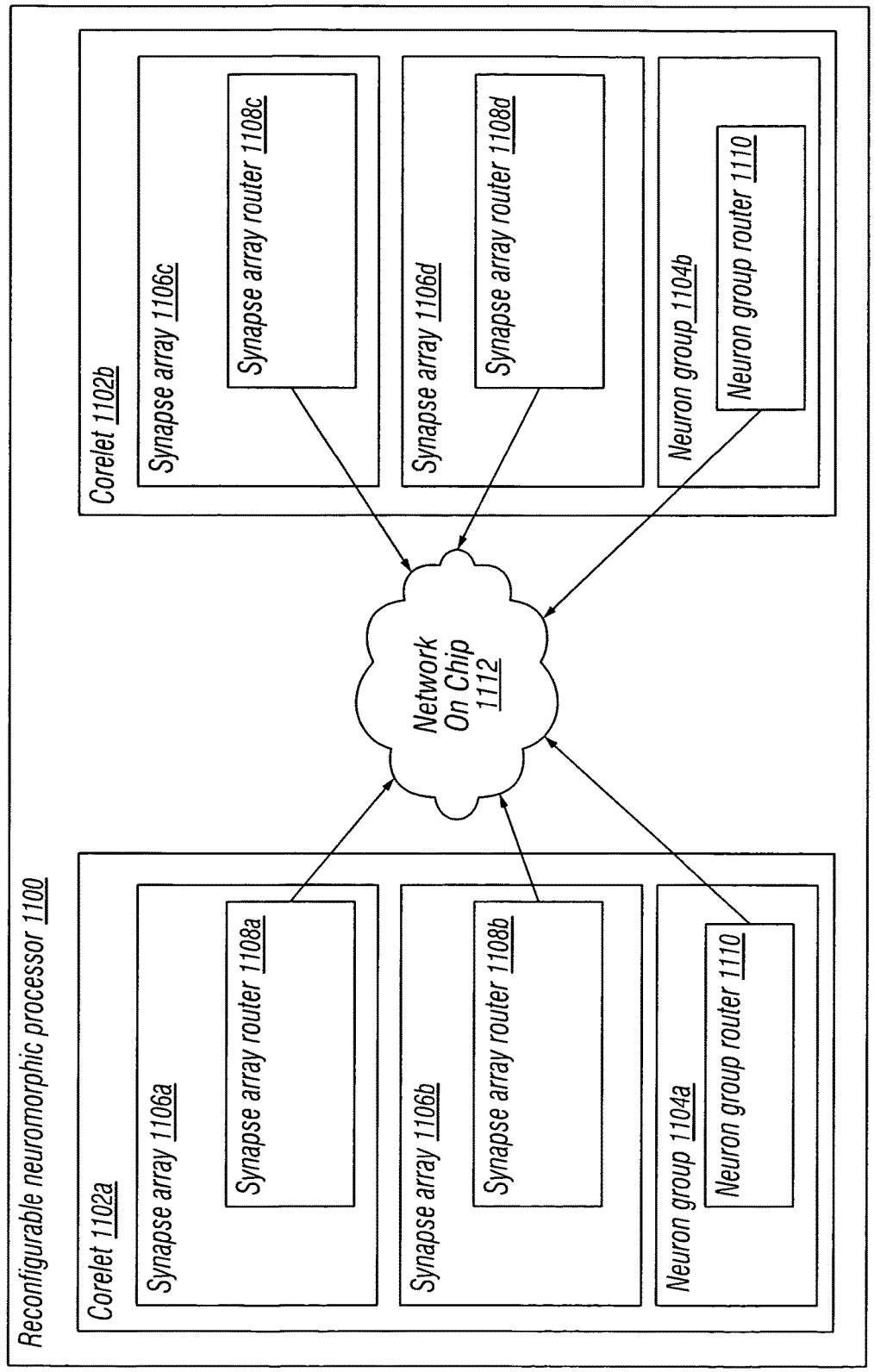
FIG. 11 is a block diagram of example corelets of a reconfigurable neuromorphic processor, according to embodiments of the present disclosure.

FIG. 11 is a block diagram of example corelets of a reconfigurable neuromorphic processor, according to embodiments of the present disclosure. Neurons and synapses of a reconfigurable neuromorphic processor may be organized into groups of synapses and neurons, referred to as "corelets." For example, as depicted in FIG. 11, reconfigurable neuromorphic processor 1100 may include corelet 1102a and corelet 1102b (collectively "corelets 1102"). Corelets 1102 may include one more neuron groups 1104a and 1104b (collectively "neuron groups 1104"). Each neuron group 1104 may include one or more neurons, such as neurons 1002, described above with references for FIG. 10. Corelets 1102 and components thereof may be implemented using circuitry or logic.

Corelets 1102 may also include synapse arrays 1106a, 1106b, 1106c and 1106d (collectively "synapse arrays 1106"). Synapse arrays 1106 may include one or more synapses. In previous neuromorphic processors, an output of each synapse may be hard-wired to a corresponding neuron. Accordingly, the maximum number of synapses that could be connected to each neuron would be dictated by the number of synapses in the corelet. For example, each corelet 1102 might include two instances of synapse arrays 1006. If each synapse array enables a fixed number (n) of synapses to connect to a particular neuron, each neuron may be connected to a maximum of this fixed number of synapses multiplied by the number of synapse arrays (2n). However, if fewer than 2n inputs are used, and then unused synapses may be idle and wasted.

Accordingly, reconfigurable neuromorphic processor 1100 may include a reconfigurable interconnect architecture rather than dedicated hard-wired interconnects to connect synapse arrays 1106 to neurons 1104. Reconfigurable neuromorphic processor 1100 may include circuitry or logic that allows synaptic arrays to be allocated to different neuron groups as needed based on the neural network topology and neuron fan-in/out. For example, synaptic array inputs and outputs may be connected to neuron groups using an interconnect fabric, such as network-on-chip 1112, rather than with dedicated connections. Reconfigurable neuromorphic processor 1100 may connect synapse arrays 1106 to neurons 1104 using synapse array routers 1108a, 1008b 1108c and 1108d (collectively "synapse array routers 1108"). Outputs of neurons 1104 may be communicated to synapses using synapse array routers 1108.

Synapse array routers 1108 may include an on-chip interconnect in the form of a bus, crossbar, or network-on-chip 1112. For example, in some embodiments, synapse array routers 1108 in different corelets may be connected via network-on-chip 1112. Accordingly, rather than directly connecting synapses to neurons, synapse array routers 1108 may allow reallocation of synapse arrays between different neurons in different corelets. Synapse array routers 1108 and components thereof may be implemented using circuitry or logic.

Accordingly, in a topology of reconfigurable neuromorphic processor 1100 where fewer than all synapses in a corelet are connected to neurons, the remaining synapses may be connected to neurons in other corelets. For example, in the example shown in FIG. 11, a maximum number of synapses that could be connected to each neuron may be limited by the total number of synapses in reconfigurable neuromorphic processor 1100 rather than by the number of synapses in a corelet. Synapse array routers 1108 may thus allow flexible synapse array mapping, which may allow reconfigurable neuromorphic processor 1100 to accommodate a wider variety of neural network topologies. Overall the flexibility and ease of use will improve neural network performance in computational intelligence problems.

Synapse array routers 1108 may use distributed routing algorithms. Synapse array routers 1108 may operate by identifying a destination address from an output of a synapse. For example, synapse array routers 1108 may read a synapse destination from a synapse memory. Based on this synapse destination, synapse array routers 1108 may route packets originating from a synapse array to a particular neuron 1104. A packet may include digital data such as synapse weight and synapse destination. A packet may be transmitted between multiple instances of synapse array routers 1108 or neuron group routers 1110 prior to reaching a neuron group router associated with the destination neuron. Accordingly, synapse array routers 1108 may include circuitry or logic that can examine a synapse destination in a packet and determine, based on a routing algorithm, where to transmit the packet. Initial synapse destinations and initial synapse weights may be written in synapse array 1106 during setup or training of reconfigurable neuromorphic processor 1100. Synapse destinations may be determined based upon a task to be performed by reconfigurable neuromorphic processor 1100. In some embodiments, a processor, such as CPU 904, may program reconfigurable neuromorphic processor 1100 by writing initial synapse weights and synapse destinations in synapse arrays 1106.

Neuron groups 1104 may include neuron group routers 1110. Neuron group routers may be similar to synapse array routers 1108, but may be associated with neuron groups 1104 rather than synapse arrays. For example, neuron group routers 1110 may also use distributed routing algorithms. Furthermore, an instance of neuron group routers 1110 may include logic or circuitry to receive a packet, and, based on a determination that a synapse destination is located in the instance of neuron group 1104 associated with neuron group routers 1110, to transmitted that packet to an input of a neuron within neuron groups 1104. Neuron group routers 1104 may also transmit packets indicating that a neuron has fired. For example, neuron group router 1104 may receive a packet from a neuron. That packet may include one or more neuron destinations. As described above with reference to FIG. 10, a neuron destination may indicate one or more synapses to which an output of an instance of neuron 1102 should be transmitted. A packet may be transmitted between multiple instances of synapse array routers 1108 or neuron group routers 1110 prior to reaching a synapse array routers associated with the destination synapse. Accordingly, neuron group routers 1104 may include circuitry or logic that can examine a neuron destination in a packet and determine, based on a routing algorithm, where to transmit the packet. Neuron group routers 1110 and components thereof may be implemented using circuitry or logic.

Using synapse array routers 1108 and neuron group routers 1110 that are interconnected through network-on-chip 1112 rather than directly connecting synapses to neurons may have numerous advantages. For example, if fewer than all synapses in a corelet are connected to a neuron, synapse array routers 1108 and neuron group routers 1110 may be used to reallocated unused synapses to other neuron groups. This in turn may allow a greater fan-in for other neurons. Some neuron groups may be disabled with minimal effect on system area or energy since these metrics are dominated by synapse array hardware and synapse weight lookup hardware.

Figure 12:
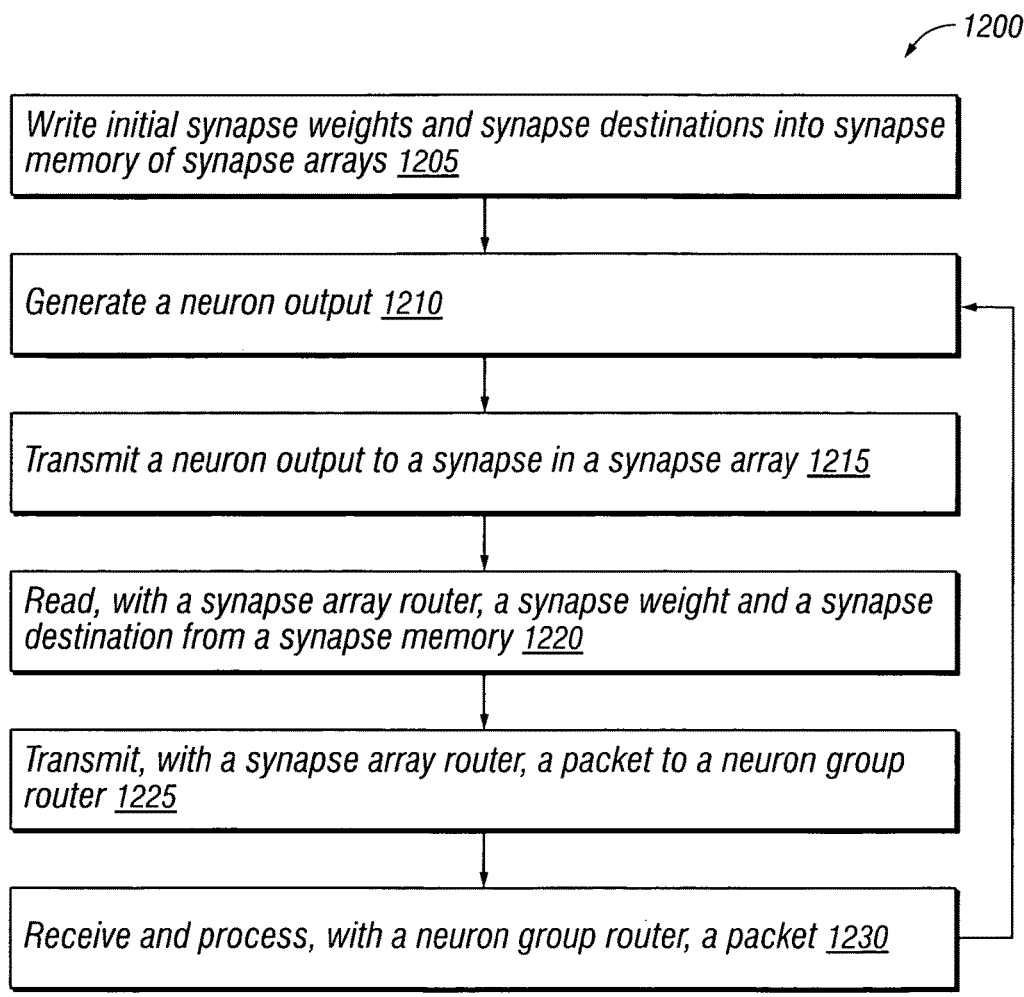
FIG. 12 is a flow chart of a method for interconnecting synapses and neurons in a reconfigurable neuromorphic processor, in accordance with embodiments of the present disclosure.

FIG. 12 is a flow chart of a method 1200 for interconnecting synapses and neurons in a reconfigurable neuromorphic processor, in accordance with embodiments of the present disclosure. Although Method 1200 describes operation of particular elements, method 1200 may be performed by any suitable combination or type of elements. For example, method 1200 may be implemented by the elements illustrated in FIGS. 1-11 or any other system operable to implement method 1200. As such, the preferred initialization point for method 1200 and the order of the elements comprising Method 1200 may depend on the implementation chosen. In some embodiments, some elements may be optionally omitted, reorganized, repeated, or combined. Moreover, portions of method 1200 may be executed in parallel within itself.

At 1205, in one embodiment initial synapse weights and synapse destinations may be written into synapse memory of synapse arrays. For example, as described above with reference to FIG. 11, initial synapse destinations and initial synapse weights may be written in synapse array during setup or training of reconfigurable neuromorphic processor. Synapse destinations may be determined based upon a task to be performed by reconfigurable neuromorphic processor. In some embodiments, a processer, such as a CPU, may initialize a reconfigurable neuromorphic processor by writing initial synapse weights and synapse destinations in synapse arrays.

At 1210, in one embodiment a neuron may generate an output. Neurons may sum or integrate a signal received at neuron inputs. In general, neurons may "fire" (transmit an output pulse) when inputs received through neuron inputs exceed a threshold. When this sum exceeds a threshold value (referred to as a" "membrane potential"), a neuron may generate an output (or "fire") from the membrane potential using a transfer function such as a sigmoid or threshold function. In some embodiments, neurons may be implemented using circuits or logic that receive inputs and integrate them. In further embodiments, inputs may be averaged, or any other suitable transfer function may be used. Furthermore, neurons may include comparator circuits or logic that generates an output spike when the result of applying a transfer function to neuron input exceeds a threshold.

At 1215, in one embodiment a neuron group router may transmit a neuron output to a synapse in a synapse array. That output may be passed through neuron output 1006 via one or more synapses 1008 to one or more neuron inputs 1004 of neurons 1002. Each instance of neuron 1002 may include neuron memory 1016. Neuron memory 1016 may be composed of static random access memory, memristors, spin torque memory, or any other suitable type of memory circuit or logic. Neuron memory 1016 may include circuitry or logic that can store one or more neuron destinations. A neuron destination may include a digital address indicating an identity of a synapse that may receive an input from a particular instance of neuron 1002. Initial neuron destinations may be written in neuron memory 1016 during setup or training of reconfigurable neuromorphic processor 1000. Neuron destinations may be determined based upon a task to be performed by reconfigurable neuromorphic processor 1000. In some embodiments, a processer, such as CPU 904, may initialize reconfigurable neuromorphic processor 1000 by writing initial neuron destinations in neuron memory 1016. Neuron group routers 1104 may transmit packets indicating that a neuron has fired. For example, neuron group router 1104 may receive a packet from a neuron. That packet may include one or more neuron destinations. As described above with reference to FIG. 10, a neuron destination may indicate one or more synapses to which an output of an instance of a neuron should be transmitted. A packet may be transmitted between multiple instances of synapse array routers or neuron group routers prior to reaching a synapse array routers associated with the destination synapse. Accordingly, neuron group routers may include circuitry or logic that can examine a neuron destination in a packet and determine based on a routing algorithm, where to transmit the packet.

At 1220, in one embodiment synapse array router may read a synapse weight and a synapse destination from a synapse memory. Synapse array routers may use distributed routing algorithms. Synapse array routers may operate by identifying a destination address from an output of a synapse. For example, synapse array routers may read a synapse destination from a synapse memory.

At 1225, in one embodiment, a synapse array router may transmit a packet to a neuron group router. Based on a synapse destination, synapse array routers may route packets originating from a synapse array to a particular neuron. A packet may include digital data such as synapse weight and synapse destination. A packet may be transmitted between multiple instances of synapse array routers or neuron group routers prior to reaching a neuron group router associated with the destination neuron. Accordingly, synapse array routers may include circuitry or logic that can examine a synapse destination in a packet and determine, based on a routing algorithm, where to transmit the packet. Initial synapse destinations and initial synapse weights may be written in synapse array during setup or training of reconfigurable neuromorphic processor. Synapse destinations may be determined based upon a task to be performed by reconfigurable neuromorphic processor. In some embodiments, a processer, such as a CPU, may initialize reconfigurable neuromorphic processor by writing initial synapse weights and synapse destinations in synapse arrays.

At 1230, in one embodiment, a neuron group router may receive and process a packet. Neuron groups may include neuron group routers. Neuron group routers may be similar to synapse array routers, but may be associated with neuron groups rather than synapse arrays. Accordingly, an instance of neuron group routers may include logic or circuitry to receive a packet, and, based on a determination that a synapse destination is located in the instance of neuron group associated with neuron group routers, to transmit that packet to an input of a neuron within neuron groups. Accordingly, if a neuron generates an output, method 1200 may return to step 1210 and repeat. Alternatively, at 1230, method 1200 may optionally repeat or terminate.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

In some embodiments of the present disclosure, a neuromorphic processor may include a plurality of corelets. In combination with any of the above embodiments, in an embodiment each corelet may include a plurality of synapse arrays. In combination with any of the above embodiments, in an embodiment each synapse array may include a plurality of synapses. In combination with any of the above embodiments, in an embodiment, each synapse may include a synapse input. In combination with any of the above embodiments, in an embodiment each synapse may include a synapse output. In combination with any of the above embodiments, in an embodiment each synapse may include a synapse memory. In combination with any of the above embodiments, in an embodiment each synapse array may include a synapse array router coupled to the synapse outputs in the synapse array. In combination with any of the above embodiments, in an embodiment each corelet array may include a neuron array. In combination with any of the above embodiments, in an embodiment each neuron array may include a plurality of neurons. In combination with any of the above embodiments, in an embodiment each synapse array router may include a first logic to route one or more of the synapse outputs to one or more of the neuron inputs.

In combination with any of the above embodiments, in an embodiment a first synapse array router may include a second logic to route a synapse output to a neuron input of a neuron in a different corelet. In combination with any of the above embodiments, in an embodiment each synapse may further include a synapse memory to store a synapse destination and a synapse weight. In combination with any of the above embodiments, in an embodiment, a first synapse array router may include a second logic to read at least one synapse memory. In combination with any of the above embodiments, in an embodiment a first synapse array router may include a third logic identify a synapse destination. In combination with any of the above embodiments, in an embodiment a first synapse array router may include a fourth logic to identify a synapse weight. In combination with any of the above embodiments, in an embodiment a first synapse array router may include a fifth logic to transmit a packet including the synapse weight and the synapse destination to a neuron group router, based on a routing algorithm. In combination with any of the above embodiments, in an embodiment in one of the corelets the number of synapses to be routed to one of the neuron inputs is greater than the number of synapses in the corelet. In combination with any of the above embodiments, in an embodiment a neuromorphic processor may include a processor including a second logic to write initial synapse destinations and initial synapse weights into the synapse memory of each of the plurality of synapses in a first corelet, wherein at least one of the synapse destinations is to a neuron array in a second corelet.

In some embodiments of the present disclosure, reconfigurable neuromorphic processor logic unit may include a plurality of corelets. In combination with any of the above embodiments, in an embodiment each corelet may include a plurality of synapse arrays. In combination with any of the above embodiments, in an embodiment each synapse array may include a plurality of synapses. In combination with any of the above embodiments, in an embodiment, each synapse may include a synapse input. In combination with any of the above embodiments, in an embodiment each synapse may include a synapse output. In combination with any of the above embodiments, in an embodiment each synapse may include a synapse memory. In combination with any of the above embodiments, in an embodiment each synapse array may include a synapse array router coupled to the synapse outputs in the synapse array. In combination with any of the above embodiments, in an embodiment each corelet array may include a neuron array. In combination with any of the above embodiments, in an embodiment each neuron array may include a plurality of neurons. In combination with any of the above embodiments, in an embodiment each synapse array router may include a first logic to route one or more of the synapse outputs to one or more of the neuron inputs.

In combination with any of the above embodiments, in an embodiment a first synapse array router may include a second logic to route a synapse output to a neuron input of a neuron in a different corelet. In combination with any of the above embodiments, in an embodiment each synapse may further include a synapse memory to store a synapse destination and a synapse weight. In combination with any of the above embodiments, in an embodiment, a first synapse array router may include a second logic to read at least one synapse memory. In combination with any of the above embodiments, in an embodiment a first synapse array router may include a third logic identify a synapse destination. In combination with any of the above embodiments, in an embodiment a first synapse array router may include a fourth logic to identify a synapse weight. In combination with any of the above embodiments, in an embodiment a first synapse array router may include a fifth logic to transmit a packet including the synapse weight and the synapse destination to a neuron group router, based on a routing algorithm. In combination with any of the above embodiments, in an embodiment in one of the corelets the number of synapses to be routed to one of the neuron inputs is greater than the number of synapses in the corelet. In combination with any of the above embodiments, in an embodiment reconfigurable neuromorphic processor logic unit may include a processor including a second logic to write initial synapse destinations and initial synapse weights into the synapse memory of each of the plurality of synapses in a first corelet, wherein at least one of the synapse destinations is to a neuron array in a second corelet.

In some embodiments of the present disclosure, a method may include in a reconfigurable neuromorphic processor receiving inputs from a plurality of synapses at a first neuron of a neuron array of a corelet. In combination with any of the above embodiments, in an embodiment a method may include applying a transfer function to the inputs. In combination with any of the above embodiments, in an embodiment a method may include generating a neuron output to a synapse based on a determination that the transfer function has exceeded a threshold. In combination with any of the above embodiments, in an embodiment a method may include based on receiving the neuron output, reading a synapse weight and a synapse destination from a synapse memory. In combination with any of the above embodiments, in an embodiment a method may include transmitting the synapse weight to the synapse destination through one of a plurality of routing channels in a first synapse router.

In combination with any of the above embodiments, in an embodiment a method may include receiving, with a neuron group router, the synapse weight and the synapse destination. In combination with any of the above embodiments, in an embodiment a method may include transmitting the synapse weight to an input of a second neuron identified in the synapse destination. In combination with any of the above embodiments, in an embodiment a method may include wherein the synapse destination is a second neuron. In combination with any of the above embodiments, in an embodiment a method may include wherein the second neuron is in a different corelet from the synapse. In combination with any of the above embodiments, in an embodiment transmitting the synapse weight to the synapse destination through one of a plurality of routing channels in a synapse router may include creating a packet containing the synapse weight and the synapse destination. In combination with any of the above embodiments, in an embodiment transmitting the synapse weight to the synapse destination through one of a plurality of routing channels in a synapse router may include transmitting the packet to a second synapse router. In combination with any of the above embodiments, in an embodiment a method may include wherein a second neuron receives inputs from a number of synapses greater than the number of synapses in one of the corelets.

In some embodiments of the present disclosure, an apparatus may include means for a plurality of corelets. In combination with any of the above embodiments, in an embodiment each corelet may include a means for a plurality of synapse arrays. In combination with any of the above embodiments, in an embodiment each synapse array may include a means for plurality of synapses. In combination with any of the above embodiments, in an embodiment, each synapse may include a means for a synapse input. In combination with any of the above embodiments, in an embodiment each a means for a synapse may include a means for a synapse output. In combination with any of the above embodiments, in an embodiment each means for a synapse may include a means for a synapse memory. In combination with any of the above embodiments, in an embodiment each means for a synapse array may include a means for a synapse array router coupled to the means for synapse outputs in the synapse array. In combination with any of the above embodiments, in an embodiment each means for a corelet array may include a means for a neuron array. In combination with any of the above embodiments, in an embodiment each means for a neuron array may include a means for a plurality of neurons. In combination with any of the above embodiments, in an embodiment each means for a synapse array router may include a means to route one or more of the synapse outputs to one or more of the neuron inputs.

In combination with any of the above embodiments, in an embodiment a means for a first synapse array router may include a means for a second logic to route a synapse output to a neuron input of a neuron in a different corelet. In combination with any of the above embodiments, in an embodiment each synapse may further include a means for a synapse memory to store a means for a synapse destination and a means for a synapse weight. In combination with any of the above embodiments, in an embodiment, a means for a first synapse array router may include a means for a second logic to read at least one means for a synapse memory. In combination with any of the above embodiments, in an embodiment a means for a first synapse array router may include a means for a third logic identify a synapse destination. In combination with any of the above embodiments, in an embodiment a means for a first synapse array router may include a means for a fourth logic to identify a synapse weight. In combination with any of the above embodiments, in an embodiment a means for a first synapse array router may include a means for a fifth logic to transmit a packet including the synapse weight and the synapse destination to a neuron group router, based on a routing algorithm. In combination with any of the above embodiments, in an embodiment in one of the means for corelets the number of synapses to be routed to one of the neuron inputs is greater than the number of synapses in the corelet. In combination with any of the above embodiments, in an embodiment an apparatus may include a means for a processor including a means for a second logic to write initial synapse destinations and initial synapse weights into the synapse memory of each of the plurality of synapses in a first corelet, wherein at least one of the synapse destinations is to a neuron array in a second corelet.

What is claimed is:

1. A neuromorphic processor, comprising:
   a plurality of corelets, each corelet to include:
      a plurality of synapse arrays, each synapse array to include:
         a plurality of synapses, each synapse to include:
            a synapse input;
            a synapse output; and
            a synapse memory to store a synapse destination of the corresponding synapse and a synapse weight for the corresponding synapse;
         a synapse array router coupled to the synapse outputs in the synapse array; and
      a neuron array to include a plurality of neurons, each neuron to include a neuron input and a neuron output;
   wherein at least one of the synapse array routers includes circuitry to:
      read at least one synapse memory;
      identify a corresponding synapse destination;
      identify a corresponding synapse weight; and
      transmit a packet including the synapse weight and the corresponding synapse destination to a particular neuron group router, based on a routing algorithm.

2. The neuromorphic processor of claim 1, wherein a first synapse array router further includes circuitry to route a synapse output to a neuron input of a neuron in a different corelet.

3. The neuromorphic processor of claim 1, wherein the neuron group router includes circuitry to:
   receive the packet;
   identify the corresponding synapse destination;
   identify the corresponding synapse weight; and
   transmit the corresponding synapse weight to at least one of the neuron inputs.

4. The neuromorphic processor of claim 1, wherein in one of the corelets the number of synapses to be routed to one of the neuron inputs is greater than the number of synapses in the corelet.

5. The neuromorphic processor of claim 1, further comprising a processor including logic to write initial synapse destinations and initial synapse weights into the synapse memory of each of the plurality of synapses in a first corelet, wherein at least one of the synapse destinations is to a neuron array in a second corelet.

6. A reconfigurable neuromorphic processor logic unit, comprising:
   a plurality of corelets, each corelet to include:
      a plurality of synapse arrays, each synapse array to include:
         a plurality of synapses, each synapse to include:
            a synapse input;
            a synapse output; and
            a synapse memory to store a synapse destination of the corresponding synapse and a synapse weight for the corresponding synapse;
         a synapse array router, the synapse array router coupled to the synapse outputs in the synapse array;
      a neuron array, including a plurality of neurons, each of the plurality of neurons including a neuron input and a neuron output;
   wherein each synapse array router includes circuitry to:
      read at least one synapse memory;
      identify a corresponding synapse destination;
      identify a corresponding synapse weight; and
      transmit a packet including the synapse weight and the corresponding synapse destination to a particular neuron group router, based on a routing algorithm.

7. The reconfigurable neuromorphic processor logic unit of claim 6, wherein a first synapse array router includes circuitry to route a synapse output to a neuron input of a neuron in a different corelet.

8. The reconfigurable neuromorphic processor logic unit of claim 6, wherein the neuron group router includes circuitry to:
   receive the packet;
   identify the corresponding synapse destination;
   identify the corresponding synapse weight; and
   transmit the corresponding synapse weight to at least one of the neuron inputs.

9. The reconfigurable neuromorphic processor logic unit of claim 6, wherein in one of the corelets the number of synapses to be routed to one of the neuron inputs is greater than the number of synapses in the corelet.

10. The reconfigurable neuromorphic processor logic unit of claim 6, further comprising a processor including logic to write initial synapse destinations and initial synapse weights into the synapse memory of each of the plurality of synapses in a first corelet, wherein at least one of the synapse destinations is to a neuron array in a second corelet.

* * * * *